United States Patent
Tsai et al.

(10) Patent No.: US 12,235,859 B2
(45) Date of Patent: Feb. 25, 2025

(54) INTEGRATED INTELLIGENT BUILDING MANAGEMENT SYSTEM AND MANAGEMENT METHOD THEREOF

(71) Applicant: Chicony Power Technology Co., Ltd., New Taipei (TW)

(72) Inventors: Jewel Tsai, New Taipei (TW); Wen-Chi Kan, New Taipei (TW)

(73) Assignee: Chicony Power Technology Co., Ltd., New Taipei (TW)

(*) Notice: Subject to any disclaimer, the term of this patent is extended or adjusted under 35 U.S.C. 154(b) by 298 days.

(21) Appl. No.: 17/194,139

(22) Filed: Mar. 5, 2021

(65) Prior Publication Data

US 2022/0019595 A1    Jan. 20, 2022

Related U.S. Application Data

(60) Provisional application No. 63/053,543, filed on Jul. 17, 2020.

(30) Foreign Application Priority Data

Dec. 24, 2020   (TW) ................................ 109146048

(51) Int. Cl.
*G06F 16/25* (2019.01)
*G06F 9/445* (2018.01)
(Continued)

(52) U.S. Cl.
CPC ........ *G06F 16/252* (2019.01); *G06F 9/44505* (2013.01); *G06F 9/5072* (2013.01);
(Continued)

(58) Field of Classification Search
CPC ...... G06F 16/25; G06F 9/44; G06Q 10/06313
See application file for complete search history.

(56) References Cited

U.S. PATENT DOCUMENTS 9,832,205 B2 * 11/2017 Santhi ...................... G06F 8/60
9,852,149 B1 * 12/2017 Taylor ................ G06F 16/1844
(Continued)

FOREIGN PATENT DOCUMENTS

CN      103673090 A    3/2014
CN      104657755 A    5/2015
(Continued)

OTHER PUBLICATIONS

M. Zhao, "Building Collaboration System of Air Logistics Service Chain Based on Cloud Computing," 2012 Second International Conference on Business Computing and Global Informatization, Shanghai, China, 2012, pp. 615-617 (Year: 2012).*
(Continued)

*Primary Examiner* — Jerry O'Connor
*Assistant Examiner* — Philip N Warner
(74) *Attorney, Agent, or Firm* — Chun-Ming Shih; HDLS IPR SERVICES

(57) ABSTRACT

An integrated intelligent building management system and a management method thereof are disclosed. The system includes a first cloud management system having a project management database, an intelligent building system managed by the first cloud management system, and a second cloud management system connecting with the first cloud-management system through a transforming interface. The management method includes the following steps. The first cloud management system receives the corresponding data of the building controlled by the intelligent building system and stores that in the project management database. The second cloud management system is authorized to connect and access the project management database. An access action from the second cloud management system to the project management database is accepted. A format transformation to data corresponding to the access action is (Continued)

performed. The second cloud management system stores the transformed data to a demand database therein.

15 Claims, 7 Drawing Sheets

(51) Int. Cl.
    *G06F 9/50*         (2006.01)
    *G06F 16/242*       (2019.01)
    *G06F 16/2452*     (2019.01)
    *G06F 16/2455*     (2019.01)
    *G06Q 10/063*      (2023.01)
    *G06Q 10/0631*     (2023.01)

(52) U.S. Cl.
    CPC .. *G06F 16/24524* (2019.01); *G06F 16/24564* (2019.01); *G06Q 10/06313* (2013.01)

(56) References Cited

U.S. PATENT DOCUMENTS

| | | | |
|---|---|---|---|
| 11,494,503 B2 * | 11/2022 | Jassal | G06F 16/128 |
| 2010/0286937 A1 * | 11/2010 | Hedley | G06Q 50/06 |
| | | | 702/60 |
| 2015/0058460 A1 * | 2/2015 | Seago | H04L 41/50 |
| | | | 709/223 |
| 2015/0188927 A1 * | 7/2015 | Santhi | G06Q 10/0631 |
| | | | 726/4 |
| 2015/0347542 A1 * | 12/2015 | Sullivan | G06F 16/2455 |
| | | | 707/602 |
| 2015/0355609 A1 | 12/2015 | Warren | |
| 2016/0182522 A1 * | 6/2016 | Kwak | H04W 12/06 |
| | | | 726/4 |
| 2016/0300156 A1 | 10/2016 | Bowers et al. | |
| 2016/0315808 A1 * | 10/2016 | Saavedra | H04L 49/70 |
| 2016/0334825 A1 | 11/2016 | Nesler et al. | |
| 2017/0075719 A1 * | 3/2017 | Scallan | G06F 11/203 |
| 2017/0315697 A1 * | 11/2017 | Jacobson | H04L 12/281 |
| 2017/0328595 A1 | 11/2017 | Iwasaki et al. | |
| 2018/0027050 A1 * | 1/2018 | Pogrebinsky | H04L 63/10 |
| | | | 709/223 |
| 2018/0191521 A1 | 7/2018 | Ahmed et al. | |
| 2018/0349817 A1 | 12/2018 | Goel et al. | |
| 2019/0028336 A1 * | 1/2019 | Coronado | H04L 67/34 |
| 2019/0149617 A1 * | 5/2019 | Gao | H04L 67/34 |
| | | | 709/223 |
| 2019/0166125 A1 * | 5/2019 | Bender | H04L 67/10 |
| 2020/0092166 A1 * | 3/2020 | Sharma | H04L 63/102 |
| 2020/0099659 A1 * | 3/2020 | Cometto | H04L 67/1001 |
| 2020/0159557 A1 * | 5/2020 | Pasupathy | H04L 67/1097 |
| 2020/0218210 A1 | 7/2020 | Deshpande et al. | |
| 2020/0233680 A1 | 7/2020 | Ma et al. | |
| 2020/0272440 A1 * | 8/2020 | Burgazzoli | G06F 16/51 |
| 2020/0319324 A1 * | 10/2020 | Au | H04W 48/16 |
| 2020/0387387 A1 * | 12/2020 | Iijima | G06F 8/36 |
| 2020/0401963 A1 * | 12/2020 | Matuchniak | H04L 51/04 |
| 2021/0003899 A1 * | 1/2021 | Zedlitz | G05B 19/048 |
| 2021/0067372 A1 * | 3/2021 | Cidon | H04L 47/125 |
| 2021/0104227 A1 * | 4/2021 | Park | G10L 15/22 |
| 2021/0124623 A1 * | 4/2021 | Zou | G06F 11/3409 |
| 2021/0274373 A1 * | 9/2021 | Barchi | H04L 45/70 |
| 2021/0295351 A1 * | 9/2021 | Wells | G06Q 10/067 |
| 2022/0351109 A1 * | 11/2022 | Woods | G06Q 10/06 |

FOREIGN PATENT DOCUMENTS

| | | | | |
|---|---|---|---|---|
| CN | 104915225 A | | 9/2015 | |
| CN | 105892427 A | | 8/2016 | |
| CN | 109685482 A | | 4/2019 | |
| CN | 109840684 A | | 6/2019 | |
| CN | 111141284 A | | 5/2020 | |
| CN | 111814171 A | * | 10/2020 | ........... G06F 21/604 |
| TW | I469070 B | | 1/2015 | |
| TW | I492185 B | | 7/2015 | |
| TW | 201706946 A | | 2/2017 | |
| TW | 201830299 | | 8/2018 | |
| TW | I634511 B | | 9/2018 | |
| TW | M593625 U | | 4/2020 | |

OTHER PUBLICATIONS

Office Action dated Dec. 2, 2021 of the corresponding Taiwan patent application No. 109146048.

Office Action dated Nov. 29, 2024 of the related corresponding China patent application No. 202110709108.8.

* cited by examiner

INTEGRATED INTELLIGENT BUILDING MANAGEMENT SYSTEM AND MANAGEMENT METHOD THEREOF

BACKGROUND OF THE DISCLOSURE

Technical Field

This disclosure relates to a building system, and particularly relates to integrated building management system and management method thereof.

Related Art

In recent years, with the development in the technologies of computer, Internet and big data, all kinds of management operation of buildings are developed in the direction toward intellectualization to improve the living quality or working performance of the users inside the buildings.

Generally, the related-art intelligent building management system emphasizes on the integration between the independent sub-systems, such as an access control system, an illumination system, an air-conditioning system, etc. Further, a friendly graphic interface is used to provide the integrated information and the function of linking control, such as activating the illumination system and the air-conditioning system at the same time when the user arrives home, for the users to increase the accessibility.

However, with the increasing of the number of building cases, the conditions need to be considered, such as the equipment types, communication protocol, control method, etc., of various buildings and auxiliary equipment thereof, are becoming more and more complicated. As a result, the related-art management systems may be insufficient for the application.

For example, one building may have multiple sub-systems inside, such as the illumination system, air-conditioning system, etc., and one project may have multiple buildings at the same time, such as multiple factories of one company in the same area, and one project manager may need to manage multiple projects, such as the headquarter may have multiple buildings for multiple worldwide branches. Under this condition, the related-art management system may be insufficient for the application.

Further, when a higher level user, such as government agency, needs to obtain different projects or related data of the buildings from multiple project managers, the related-art management system may be difficult to achieve the object of real-time data sharing. Thus, this disclosure intends to solve the aforementioned problems.

SUMMARY OF THE DISCLOSURE

The object of this disclosure is to provide an integrated intelligent building management system and management method thereof. This disclosure may grant the access authority of the database to the additionally established cloud management system at any time to achieve the object of real-time data sharing.

In some embodiments of present disclosure, an integrated intelligent building management system includes a first cloud management system, an intelligent building system and a second cloud management system. The first cloud management system includes a first cloud configuration platform and a project management database having a first transforming interface and a data transforming service module. The intelligent building system is connected with and managed by the first cloud management system. A corresponding data of a building controlled by the intelligent building system is stored in the project management database. The second cloud management system includes a second cloud configuration platform and a demand database having a second transforming interface.

The first cloud management system is connected with the second transforming interface of the second cloud management system through the first transforming interface, and authorizes the second cloud management system to connect and access the project management database. The first cloud management system performs a format transformation to data in the project management database through the data transforming service module, and the second cloud management system stores a transformed data in the demand database.

In some embodiments of present disclosure, a management method includes following steps. The corresponding data of the building from the intelligent building system is received and stored in the project management database by the first cloud management system. The first cloud management system is connected with the second transforming interface of the second cloud management system through the first transforming interface. The second cloud management system is authorized to connect and access the project management database by the first cloud management system. An access action of the second cloud management system to the project management database is accepted by the first cloud management system. The format transformation is performed to data corresponding to the access action through the data transforming service module by the first cloud management system. The transformed data is stored in the demand database by the second cloud management system.

Comparing to the related-art, this disclosure may achieve the technical functions as below. The user may establish one second cloud management system above the first cloud management system at any time based on the need. Further, the user may authorize the second cloud management system to access the corresponding data in the database of the first cloud management system. Thus, the object of instant data sharing may be achieved.

The corresponding user may search necessary data through the second cloud management system and perform necessary analysis to the obtained data through the technical features of this disclosure. Further, after data is searched and analyzed, the user may close the second cloud management system at any time without interfering the structure of the existing integrated management system. Therefore, the scalability and security of the integrated management system may be achieved simultaneously.

DETAILED DESCRIPTION OF THE DISCLOSURE

The embodiments of this disclosure will be described with reference to the drawings. These are, of course, merely examples and are not intended to be limiting.

Figure 1:
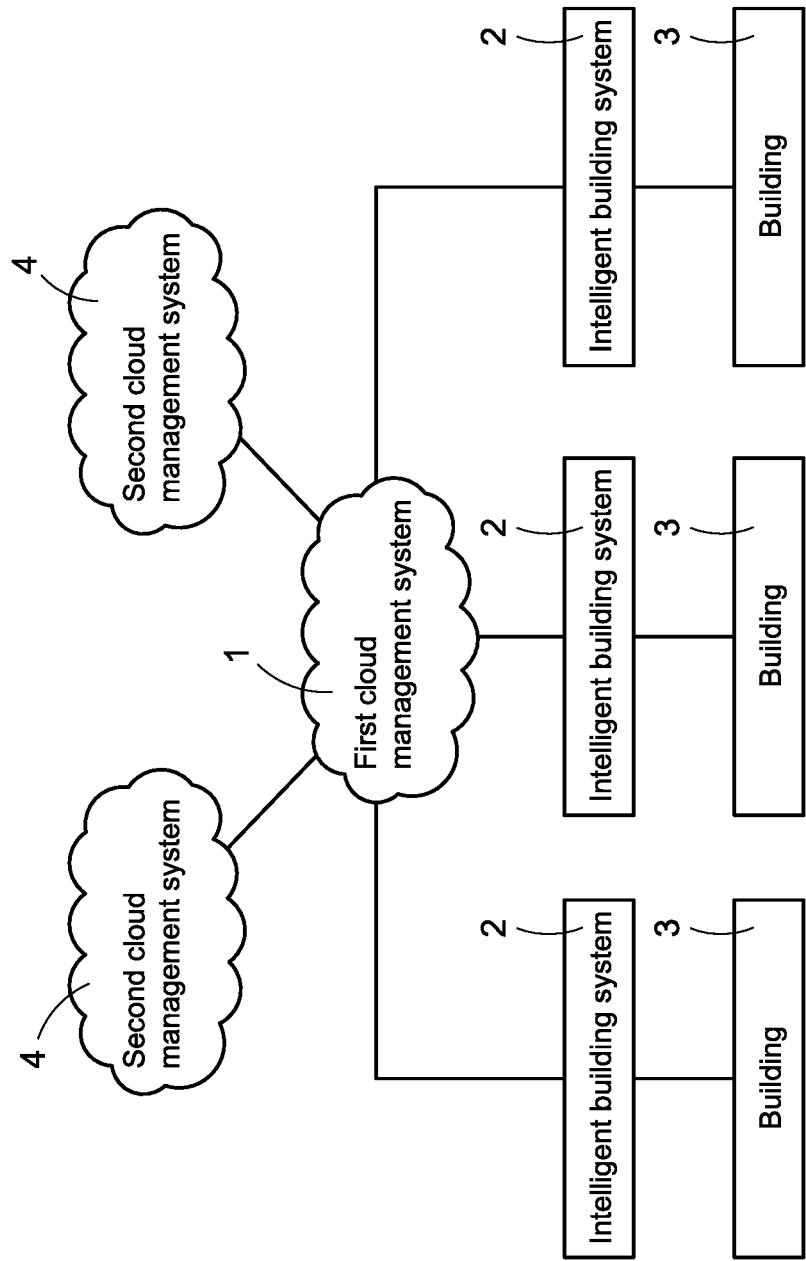
FIG. 1 is a system architecture diagram in the first embodiment of this disclosure.

FIG. 1 is a system architecture diagram in the first embodiment of this disclosure. Referring to FIG. 1, an integrated intelligent building management system (hereafter as integrated management system) is disclosed in this disclosure. The integrated management system at least includes a first cloud management system (for example, IWA Cloud) 1 and one or multiple intelligent building systems (for example, IWA Center) 2 connected with and managed by the first cloud management system 1. Each intelligent building system 2 manages one building 3.

Referring to FIG. 1, each intelligent building system 2 manages one building 3 in this disclosure. The first cloud management system 1 is a virtual system established on the cloud, such as Amazon Web Services (AWS), for managing one or multiple projects. In one embodiment, each project at least includes the buildings 3 controlled by all of the intelligent building systems 2 which are connected under the first cloud management system 1.

One technical feature of this disclosure is that when the user of the integrated management system has particular demand, the user may control the first cloud management system 1 to execute bottom-up data authorization. Thus, one or multiple second cloud management systems 4 may further be established on the first cloud management system 1. The corresponding users, such as government agencies or investors, etc., may search the corresponding data and the analytical result for that based on specific analytical strategy of the authorized specific project/specific building 3 through establishment and usage of the second cloud management system 4 without interfering the structure of the existing integrated management system.

In one embodiment, the second cloud management system 4 may be established on the same cloud space with the first cloud management system 1. In another embodiment, the second cloud management system 4 may be established on the different cloud space with the first cloud management system 1. Here is not intended to be limiting.

This disclosure may facilitate the realization of data analysis and sharing across multi-projects and multi-buildings for the user through the aforementioned technical features.

Figure 2:
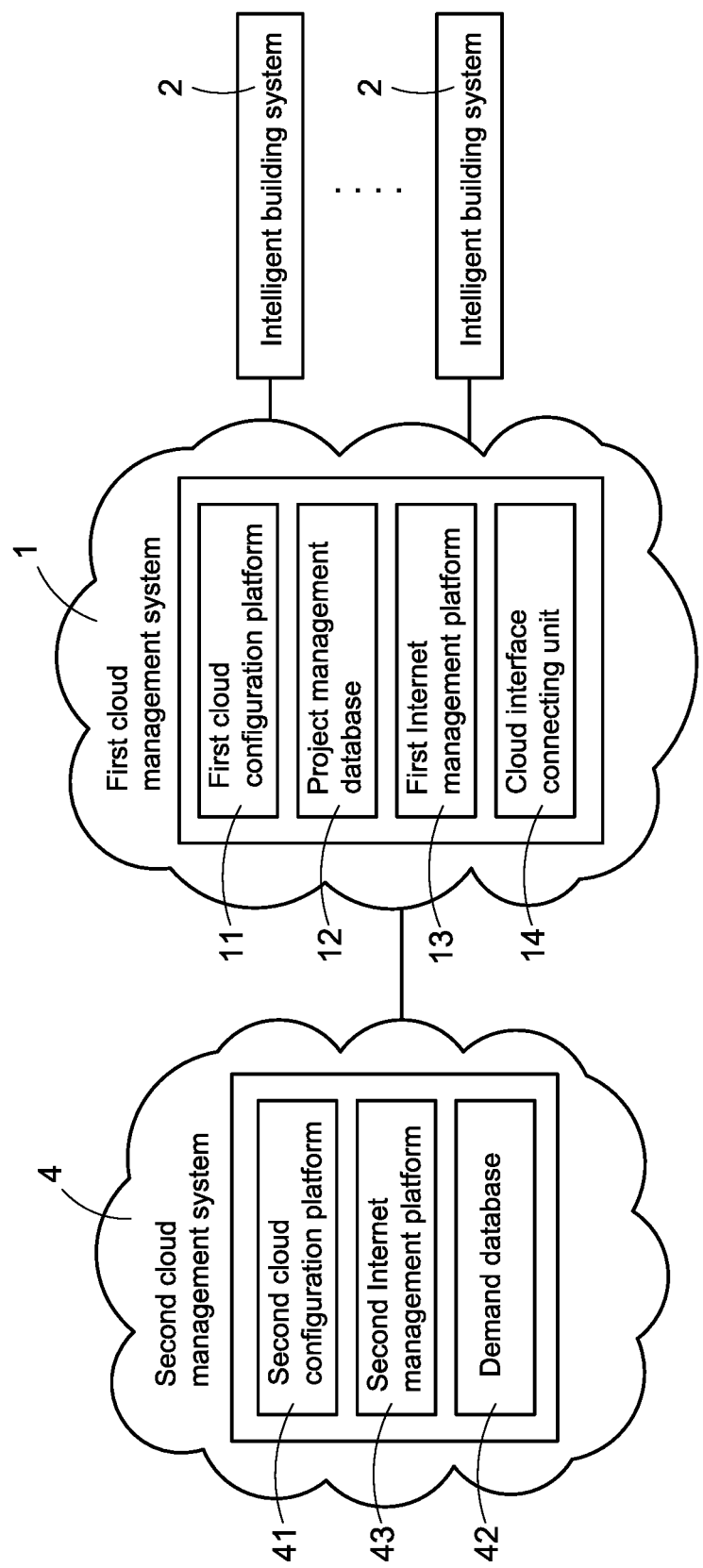
FIG. 2 is a system architecture diagram in the second embodiment of this disclosure.

FIG. 2 is a system architecture diagram in the second embodiment of this disclosure. Referring to FIG. 2, the first cloud management system 1 includes a first cloud configuration platform (or setter) 11 and a project management database 12. The project management database 12 has a first transforming interface (not shown in figures). In one embodiment, the first cloud management system 1 is a virtual system established on the cloud. The first cloud configuration platform 11 and the project management database 12 are virtual units accomplished by software. Here is not intended to be limiting.

As described above, the first cloud management system 1 manages at least one project through the configuration from the user. Each project includes one or multiple buildings 3. In this embodiment, the first cloud management system 1 further includes a cloud interface connecting unit 14. The first cloud management system 1 connects with one or multiple intelligent building systems 2 through the cloud interface connecting unit 14. Each intelligent building system 2 is in charge of one building 3 in the project.

Specifically, each intelligent building system 2 may practically receive the equipment data of multiple equipment inside the building 3 and the first cloud management system 1 receives the equipment data, which are uploaded by each intelligent building system 2 respectively, through the cloud interface connecting unit 14. In this disclosure, each intelligent building system 2 stores the corresponding data of the building 3 controlled by itself on the project management database 12 of the first cloud management system 1 (described hereafter).

Referring to FIG. 2, the second cloud management system 4 includes a second cloud configuration platform 41 and a demand database 42. The demand database 42 has a second transforming interface (not shown in figures). In one embodiment, the second cloud management system 4 is a virtual system established on the cloud. The second cloud configuration platform 41 and the demand database 42 are virtual units accomplished by software. Here is not intended to be limiting.

In this disclosure, the first cloud management system 1 may accept the external operation from the user and configure the authority to be granted according to the external operation. The first cloud management system 1 may directly establish the second cloud management system 4 online based on the content of the granted authority.

Specifically, the user, such as the project manager, may connect the first cloud management system 1 remotely by computer, smart phone, or server through Internet. The user may perform the external operation to the first cloud management system 1 through a graphic user interface (GUI), and control the first cloud management system 1 to grant the authority of one or multiple projects managed by the first cloud management system 1 accordingly. In one embodiment, the authority may be the access authority, and/or the access duration, etc., for the corresponding data of specific project/specific building 3. Here is not intended to be limiting. When the configuration of the authority is finished, the user may activate a cloud management system establishment button (not shown in figures) on the first cloud management system 1 through the GUI. When the button is activated, the first cloud management system 1 may establish the second cloud management system 4 on the cloud instantly based on the authority content configured by the user.

According the established relation, the first cloud management system 1 may connect with the second transforming interface of the second cloud management system 4 through the first transforming interface instantly after the second cloud management system 4 is established. The first cloud management system 1 may authorize the second cloud management system 4 to connect to the project management database 12. Further, the second cloud management system 4 may access data in the project management database 12 under the authorized scope.

In one embodiment, the first cloud management system 1 establishes a Docker image based on the authorized content configured by the user after the button is activated. Thus, the cloud space, such as the AWS, may execute the image to establish the second cloud management system 4 with specific content.

It should be noted that the user of the first cloud management system 1 may be the project manager, such as the administrator of the headquarter, and the user of the second cloud management system 1 may be the corresponding person with particular purpose, such as the government agency having supervisory responsibilities to multi-projects/multi-buildings. The project management database 12 and the demand database 42 may adopt different data structure based on the work environment of different users. Under this consideration, the project management database 12 in this disclosure further includes a data transforming service module (not shown in figures) disposed therein.

In one embodiment, when the access action from the second cloud management system 4 is accepted, the first cloud management system 1 performs format transformation to the target data, such as the illumination equipment data of building A, air-conditioning equipment data of building B, etc., in the access action through the data transforming service module. The second cloud management system 4 obtains and stores the transformed data in the demand database 42 to complete the data sharing.

It should be noted that the first cloud management system 1 may record the application program interface (API) used by the second cloud management system 4. The data transforming service module follows the API of the second cloud management system 4 to transform data to the receivable format of the second cloud management system 4 during performing the format transformation action. Here is not intended to be limiting.

In this disclosure, the second cloud management system 4 may not directly connect to and manage any one of the project/building. The second cloud management system 4 solely obtains the authorized corresponding data of specific project/specific building through the first cloud management system 1 and analyzes the obtained data to make corresponding statement. Specifically, the establishment and usage of the second cloud management system 4 may facilitate the obtaining and viewing of the corresponding data for the corresponding members, such as original data, analytical data, and statement, etc., of specific project/specific building instantly, and the direct control and management of the project/building is not involved.

This disclosure may effectively classify the authorities of the first cloud management system 1 and the second cloud management system 4 through the aforementioned technical features. When the corresponding members finished specific tasks, the integrated management system of this disclosure may terminate the second cloud management system 4 (i.e., withdraw the authorization from the first cloud management system 1) at any time. Thus, the scalability and security of the integrated management system may be achieved simultaneously.

As described above, the second cloud management system 4 of this disclosure is directly established based on the granted authority from the first cloud management system 1. Therefore, the second cloud management system 4 may access the project management database 12 of the first cloud management system 1 based on the preset authority to obtain the corresponding data, such as the energy data of the first project, the illumination-related data of the building A in the second project, etc.

In another embodiment, the second cloud management system 4 after being established may accept the external operation from the user, such as government agency, through the second cloud configuration platform 41 to request the first cloud management system 1 to modify the granted authority, i.e., modify the access authority of the second cloud management system 4 for the project management database 12.

In this embodiment, the second cloud management system 4 may store the access authority for the project management database 12 through the demand database 42 and store the analysis rule to data obtained from the project management database 12. In one embodiment, the analysis rule may be algorithm used by analysis, types of analysis, time point of analysis, action executed after analysis, etc. Here is not intended to be limiting.

When attempting to access data in the project management database 12, the second cloud management system 4 may only send corresponding request to the first cloud management system 1 based on the access authority. When attempting to execute data analysis, the second cloud management system 4 may only execute necessary analysis to data obtained from the project management database 12 based on the analysis rule. This disclosure may facilitate the operation of the establishment and usage of the second cloud management system 4 for the user through the aforementioned technical features.

In this disclosure, the first cloud configuration platform 11 of the first cloud management system 1 may has a project management module, a building management module, and an equipment communication management module (not shown in figures). Here is not intended to be limiting.

The project management module may accept the external operation to establish one or multiple projects controlled by the first cloud management system 1. The building management module may accept the external operation to import, establish and manage the planar graph and 3D model of one or multiple buildings 3 in each project, such as to provide transformation service for building information modeling (BIM) or manage the transformed BIM model. The equipment communication management module may accept the external operation to define the communication protocol of various equipment in each building 3.

It should be noted that the first cloud management system 1 is disposed on the cloud, thereby when the same user or different users establish different projects or configure different buildings 3, the users may directly use the defined equipment data, such as the communication protocol, in the first cloud management system 1. As a result, the integrated management system of this disclosure may effectively save time cost of the user for establishing the equipment data of the same or similar equipment repeatedly.

The first cloud management system 1 may generate the corresponding cloud configuration file based on the actions, such as establishing the second cloud management system 4, defining the equipment data, etc., after all of the actions are finished. In this disclosure, the first cloud management system 1 may release the cloud configuration file to one or multiple intelligent building systems 2 connected thereon to synchronize with the intelligent building systems 2 according to the cloud configuration file.

As described above, the intelligent building system 2 is used to manage one building 3 and the first cloud management system 1 is used to manage one or more projects having one or multiple buildings 3. In other words, the first cloud management system 1 is superordinate above the intelligent building system 2. Thus, when the intelligent building system 2 received the cloud configuration file released by the first cloud management system 1, the configuration is confined by the cloud configuration file. On the other hand, the cloud configuration file includes most of the configuration parameters, such as the communication protocol of each equipment, thereby the user does not need to configure otherwise in the intelligent building system 2 with respect to the configuration parameters. Thus, the configuration time may be effectively decreased.

Referring to FIG. 2, the first cloud management system 1 further includes a first Internet management platform 13 and the second cloud management system 4 further includes a second Internet management platform 43. In this embodiment, the first Internet management platform 13 may provide a first real-time information display module and a first alarm module through a first Internet front-end (or first cell phone front-end). The second Internet management platform 43 may provide a second real-time information display module and a second alarm module through a second Internet front-end (or second cell phone front-end).

In this disclosure, the first cloud management system 1 is used to manage one or multiple projects and the user may actively search the corresponding information of one or multiple projects through the first real-time information display module. When a problem occurs in any project, the user may receive an alarm message with respect to the project through the first alarm module. In contrary, the second cloud management system 4 is used to access and analyze data of the authorized project. The user may actively search the corresponding information, such as original data and analyzed data, of the authorized project through the second real-time information display module and receive the corresponding alarm message through the second alarm module passively.

Figure 3:
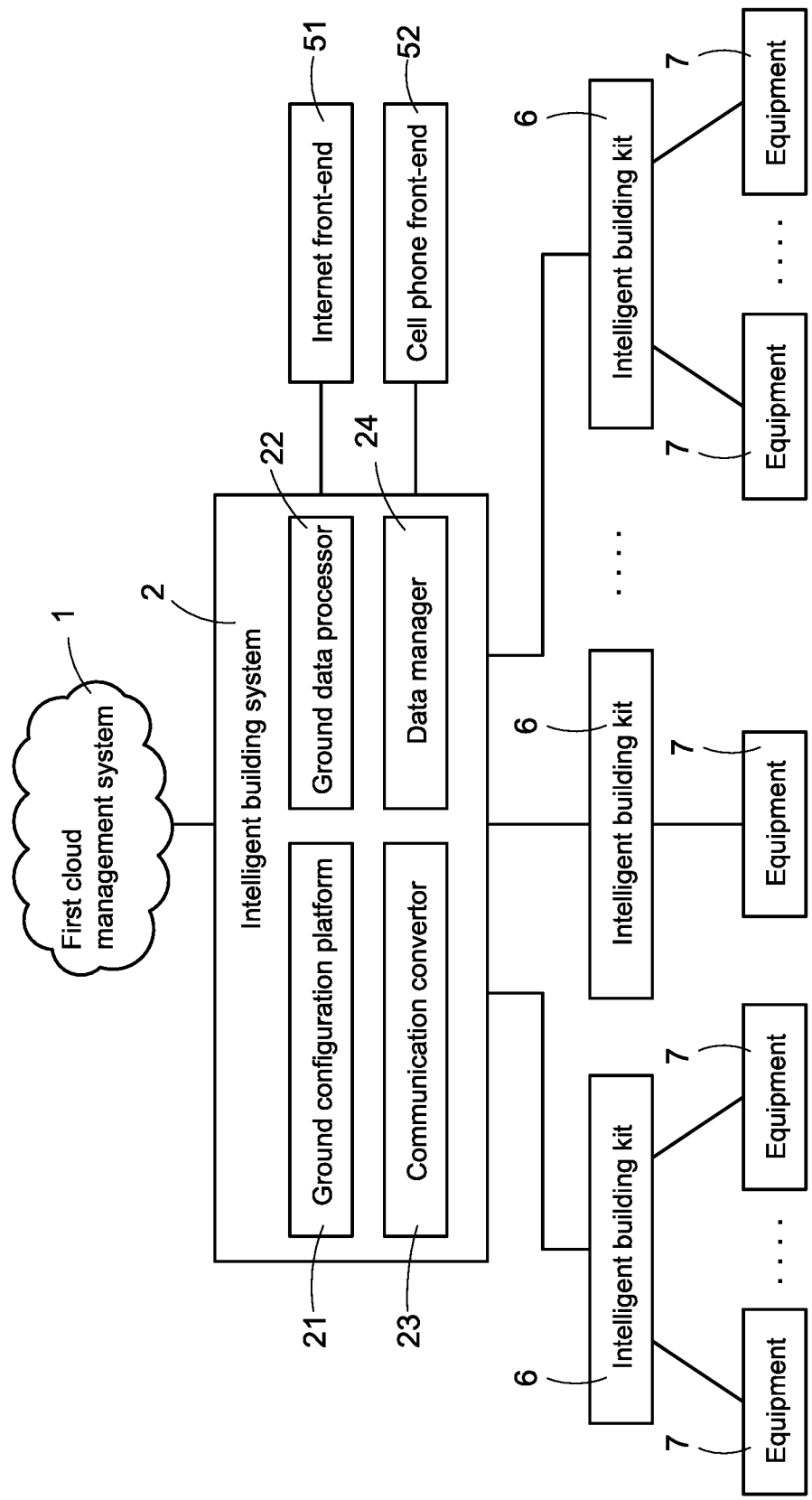
FIG. 3 is a system architecture diagram in the third embodiment of this disclosure.

FIG. 3 is a system architecture diagram in the third embodiment of this disclosure. Referring to FIG. 3, in this disclosure, the intelligent building system 2 may be a software system carried out by physical computer and server and is used to manage the designated building 3. In the embodiment of FIG. 3, the intelligent building system 2 at least includes a ground configuration platform 21, a ground data processor 22, a communication convertor (or communication broker) 23 and a data manager 24. It should be noted that the ground configuration platform 21, the ground data processor 22, the communication convertor 23 and the data manager 24 may be virtual units accomplished by software or physical elements carried out by hardware. Here is not intended to be limiting.

The ground configuration platform 21 receives the cloud configuration file from the first cloud management system 1 and configures the intelligent building system 2 and multiple equipment 7 in the building 3, which is controlled by the intelligent building system 2, according to the cloud configuration file. The ground configuration platform 21 further generates the corresponding ground configuration file based on the configuration result (described hereafter). In one embodiment, the ground configuration platform 21 is confined by the cloud configuration file when performing the configuration action of the ground equipment. Moreover, the cloud configuration file has some configurations, such as the communication protocol of each equipment, to the ground equipment, thereby the ground configuration platform 21 may only need to configure the parameters not included in the cloud configuration file.

For example, the ground configuration platform 21 may accept the external operation from the user through Internet or physical cable to configure the corresponding information rendering on the Internet front-end 51 or cell phone front-end 52 connected with the intelligent building system 2. For another example, the ground configuration platform 21 may configure the kit properties of one or multiple intelligent building kits (or IWA kit) 6 connected with the intelligent building system 2. Here is not intended to be limiting.

The ground data processor 22 is used to perform a statistical analysis to data collected from the controlled building 3. Specifically, the intelligent building system 2 connects multiple equipment 7 in the controlled building 3 through one or multiple intelligent building kits 6 and collects the feedback information of the equipment 7. Further, the intelligent building system 2 performs the statistical analysis to the feedback information and records the feedback information.

It should be noted that the intelligent building system 2 processes a command request, such as a request of searching the feedback information or analytical data to specific equipment 7, received from the Internet front-end 51 or cell phone front-end 52 through the ground data processor 22.

In one embodiment, the intelligent building system 2 may use the ground data processor 22 as a connecting interface module with the first cloud management system 1 therebetween. Specifically, the intelligent building system 2 collects and compiles data, such as the feedback information of the equipment 7, uploaded by all of the intelligent building kits 6 connected thereon through the ground data processor 22. The intelligent building system 2 further uploads data to the first cloud management system 1 and stores data in the project management database 12.

The communication convertor 23 is used to establish communication between the intelligent building system 2 and the controlled building 3. In one embodiment, the communication convertor 23 may be a message queuing telemetry transport broker (MQTT broker). For example, the communication convertor 23 is carried out by standard Mosquito 1.5.4. Here is not intended to be limiting. The intelligent building system 2 establishes subscription rule through the communication convertor 23 to respectively perform message delivery with the components, such as each intelligent building kit 6, the ground configuration platform 21, the Internet front-end 51 and the cell phone front-end 52, etc.

The data manager 24 is used to store the corresponding data of the intelligent building system 2 and may include a real-time database and a history database (not shown in figures). Specifically, the real-time database may be a database using MySQL and is used to record relatively real-time data, such as the cloud configuration file and/or the ground configuration file. The history database may be a database using MongoDB and is used to record the historical records of the intelligent building system 2, each intelligent building kit 6, and/or each equipment 7.

In one embodiment, the intelligent building system 2 may perform data backup and recovery of the cloud configuration file and/or the ground configuration file through the data manager 24. Thus, the intelligent building system 2 may achieve the object of database backup through the data manager 24.

It should be noted that the ground configuration platform 21 has configuration file generating unit (not shown in figures). In this disclosure, the ground configuration platform 21 accepts remote control or offline control through the configuration file generating unit to perform corresponding configuration action to the components, such as the ground data processor 22, the intelligent building kit 6, the Internet front-end 51 and the cell phone front-end 52, etc., and generates the ground configuration file according to the configuration result.

The ground configuration platform 21 may further include at least one sub-module (not shown in figures). The sub-module is activated or deactivated through the control from the first cloud management system 1, such as configuring the sub-module through the release of the cloud configuration file. The access authority (readout and write-in) of the sub-module is determined based on content of the ground configuration file. For example, the sub-module may be a planar information module, a BIM model module, a statistical diagram module, an alarm notification module, an equipment monitoring module, etc., to provide display function for corresponding information through the Internet front-end 51 or cell phone front-end 52. If the sub-modules are activated and have the access authority for the database, the user may connect and use the sub-modules through the Internet front-end 51 or cell phone front-end 52 to obtain corresponding information provided by the sub-modules.

Referring to FIG. 1 and FIG. 3, the intelligent building system 2 of this disclosure is in charge of managing at least one building 3. The building 3 has multiple equipment 7, such as energy detection equipment, illumination equipment, air-conditioning equipment, image equipment, etc. The intelligent building system 2 is connected to the multiple equipment 7 with different properties in the building 3 through multiple intelligent building kits 6. In one embodiment, each intelligent building kit 6 receives the ground configuration file from the connected intelligent building system 2 and periodically obtains the equipment data of the connected one or multiple equipment 7 based on content of the ground configuration file.

In this disclosure, the intelligent building kit 6 is a relay layer between the intelligent building system 2 and the equipment on the bottom end and is a universal type connecting device.

Specifically, the intelligent building kit 6 is preset to accommodate various functions. The functions of the intelligent building kit 6 are not activated before connected to the equipment 7. The intelligent building kit 6 does not belong to any specific type. In this disclosure, the intelligent building system 2 determines the kit property of the intelligent building kit 6, such as writing the kit property into the ground configuration file, according to the equipment property or type of the equipment 7 connected under one intelligent building kit 6. When the ground configuration file is received, the intelligent building kit 6 may configure the kit property thereof according to content of the ground configuration file. The intelligent building kit 6 further starts corresponding function based on the kit property, and provides the functions to one or multiple equipment 7 connected thereon, and periodically obtains equipment data/equipment status according to the properties of the equipment 7 at the same time.

In one embodiment, the ground data processor 22 of the intelligent building system 2 has a data receiving unit, a command processing unit and a cloud interface connecting unit (not shown in figures). The data receiving unit is used to receive the equipment data uploaded by the intelligent building kit 6. The command processing unit is used to receive the command request of the Internet front-end 51 or the cell phone front-end 52. The cloud interface connecting unit is used to upload the received equipment data to the first cloud management system 1.

As described above, the intelligent building kit 6 may confirm the kit property thereof according to the equipment property or type of the connected equipment 7. In other words, the intelligent building kit 6 may be transformed from the universal type connecting device to a specific type connecting device. The intelligent building kit 6 further has an edge computing module (not shown in figures). The edge computing module may provide and execute corresponding intelligent computing analytical function according to the equipment property or type of the multiple equipment 7 connected thereon. In one embodiment, the intelligent building kit 6 activates the intelligent computing analytical function according to the ground configuration file.

In this embodiment, after the equipment data of the connected equipment 7 is periodically obtained, the intelligent building kit 6 may perform corresponding analytical action to the equipment data and then upload the analytical result to the intelligent building system 2. As a result, the computing load of the ground data processor 22 in the intelligent building system 2 may be balanced and the response time of data processing may also be improved. On the other hand, the intelligent computing analytical function provided by the intelligent building system 2 may be expanded correspondingly according to the intelligent building kit 6 connected thereon. Thus, the future need of the user possibly derived from the evolution of technology may further be fulfilled.

Figure 4:
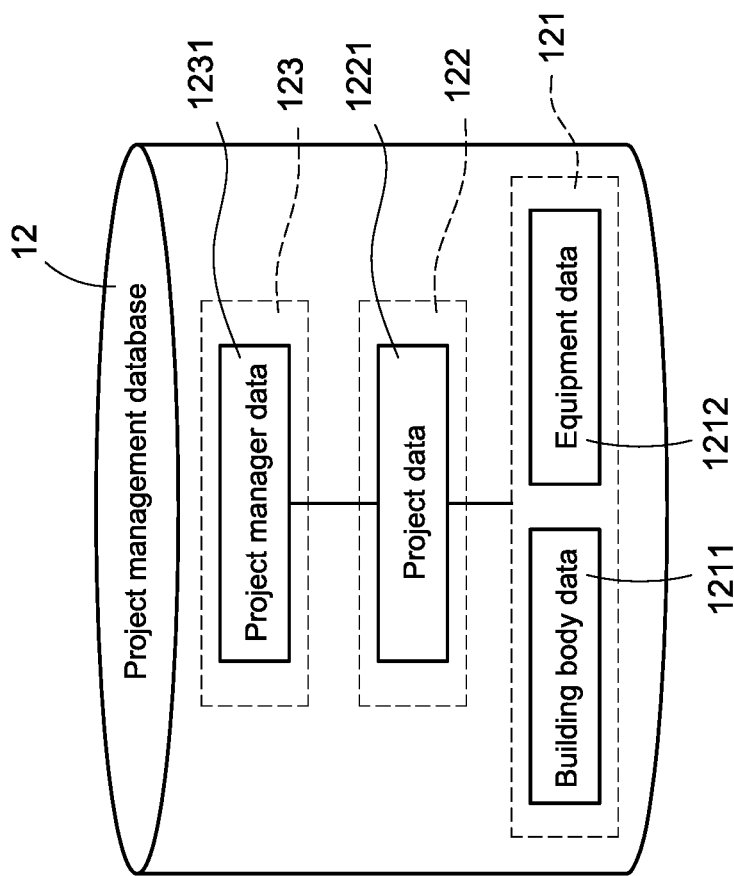
FIG. 4 is a schematic view of the project management database in the first embodiment of this disclosure.

FIG. 4 is a schematic view of the project management database in the first embodiment of this disclosure. In this disclosure, the first cloud management system 1 is located on a higher level of the hierarchy. Thus, the first cloud management system 1 may manage one or multiple projects at the same time. The project management database 12 used by the first cloud management system 1 is a hierarchical database.

Referring to FIG. 4, the project management database 12 is virtually partitioned into a first layer database field 121, a second layer database field 122 and a third layer database field 123. The second layer database field 122 accommodates all the data in the first layer database field 121. The third layer database field 123 accommodates all the data in the second layer database field 122.

In one embodiment, the first layer database field 121 is used to store a building body data 1211 and an equipment data 1212. The building body data 1211 may be the basic information, such as a building name, a building location, etc., of the building 3 controlled by one or multiple intelligent building systems 2 under the first cloud management system 1. In another embodiment, the building body data 1211 may further include the environmental information, such as weather record, official management regulations, electricity pricing regulations, etc., at the location of the building 3. Here is not intended to be limiting. The equipment data 1212 is the corresponding information of multiple equipment 7 installed and used in the building 3, such as the floor where each equipment 7 is located, equipment specification, operation status, maintenance record, management mechanism, control logic, fault diagnosis basis, performance analysis method, etc. Here is not intended to be limiting.

As described above, the first layer database field 121 in the project management database 12 belongs to the hierarchy of building and is used to store data corresponding to one or multiple buildings 3.

In one embodiment, the second layer database field 122 is linked with the first layer database field 121 and used to store a project data 1221 of the project including one or multiple buildings 3 recorded in the first layer database field 121.

In this disclosure, each project may manage one or multiple buildings 3 at the same time. The geographic locations of the buildings 3 are generally adjacent to each other, or the buildings 3 belong to the same construction project. This disclosure facilitates the simultaneous management of multiple corresponding buildings for the user through establishment of the project. Further, data of the buildings 3, such as the building body data 1211 and the equipment data 1212, is accumulated in the second layer database field 122 to be the project data 1221. Thus, the first cloud management system 1 may efficiently perform statistical analysis, such as energy utilization rate, comparison of equipment service life, etc., for multi-buildings 3 and output corresponding improvement suggestions. Moreover, the multiple buildings 3 under the same project may learn more effective control strategies used by the other buildings 3 through hierarchical record, management and analysis, thereby the efficiency is further improved.

In one embodiment, the third layer database field 123 is linked with the second layer database field 122 and used to store a project manager data 1231 of the project managers in the one or multiple projects recorded in the second layer database field 122.

In this disclosure, each project manager may simultaneously manage multiple projects based on the job duties. For example, the project manager may be a property management company that simultaneously manages multiple construction projects, or a headquarter management department having multiple branch buildings in multiple regions, etc.

Comparing to the building group in the same project, the building group belonging to different projects may have the differences of geographical locations, environment and weather, and official management regulations. When the statistical analysis based on the project manager data 1231 in the third layer database field 123 is performed, the first cloud management system 1 may adopt more variation factors to perform more complicated analysis. As a result, the user may obtain comprehensive comparing data of different projects from the first cloud management system 1 to further analyze the varieties between multiple buildings 3 under different projects.

In this disclosure, the first cloud management system 1 may accept the external operation through GUI to configure for granting the authority of entire data or partial data in the first layer database field 121, the second layer database field 122 and the third layer database field 123, and to establish the second cloud management systems 4 based on the granted authority. Accordingly, when the second cloud management systems 4 starts to operate, the second cloud management systems 4 may access entire data or partial data in the first layer database field 121, the second layer database field 122 and the third layer database field 123 correspondingly according to the granted authority, and performs corresponding statistical analysis to the obtained data.

By the aforementioned technical features of this disclosure, the corresponding member may search corresponding data of specific building 3 and/or specific project through the second cloud management systems 4 without directly accessing the project management database 12 of the first cloud management system 1. The system scalability may be achieved and usage for the user is facilitated.

It should be noted that the project management database 12 is associated with an enormous equipment template infobase which comprises a variety of equipment information (not shown in figures). Specifically, the user may priorly collect and establish the complete data, such as specification, property, communication protocol, data transmission format, etc., of each known equipment 7 possibly used in each building 3, and construct the equipment template infobase based on the complete data. In one embodiment, the equipment template infobase is recorded in the first layer database field 121.

Apart from the known equipment 7, such as the equipment provided or manufactured by the same provider of the first cloud management system 1, the intelligent building system 2, the intelligent building kit 6, the equipment template infobase may accept the configuration from the user for data, such as specification, property, communication protocol, data transmission format, etc., of one or multiple unknown equipment to add the equipment data of the unknown equipment to the first layer database field 121 collectively.

In this disclosure, the equipment data of each equipment 7 (including the known equipment and the unknown equipment) is recorded in the first layer database field 121 by flexible data structure, such as recording in a manner of matching one data label with one data, to constitute the equipment template infobase. When the user operates the intelligent building system 2 through GUI to deploy corresponding one or multiple equipment 7 for each building 3, the user may directly and repeatedly use the equipment data recorded in the equipment template infobase without delegating to engineer for editing the equipment data of multiple equipment 7 repeatedly. The time cost of deploying the equipment 7 may be decreased.

Figure 5:
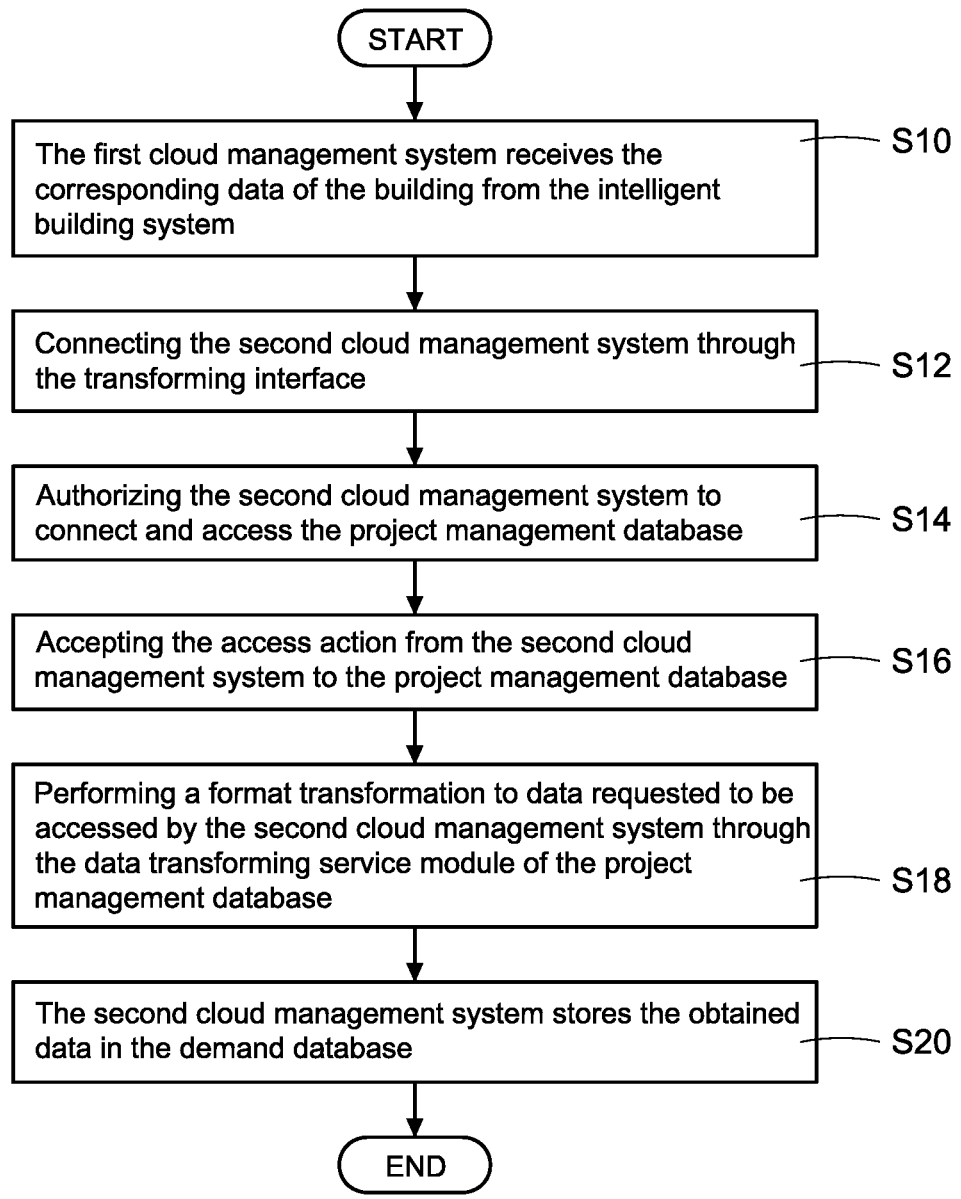
FIG. 5 is a management flowchart in the first embodiment of this disclosure.

FIG. 5 is a management flowchart in the first embodiment of this disclosure. FIG. 5 shows an integrated intelligent building management method (hereafter as management method) of this disclosure. The management method is used for the integrated management system shown in the FIG. 1 to FIG. 3 to facilitate the management and statistical analysis toward data of one or multiple projects/one or multiple buildings for the users and corresponding members.

Referring to FIG. 5, the integrated management system of this disclosure receives the corresponding data of the building 3 from the intelligent building system 2 by the first cloud management system 1 (step S10), and stores data in the project management database 12. Specifically, the first cloud management system 1 stores data of the building 3 through the first layer database field 121 in the project management database 12, and stores data of the project including multiple buildings 3 through the second layer database field 122, and stores data of the project managers simultaneously managing multiple projects through the third layer database field 123.

In this disclosure, the first cloud management system 1 is connected with the second transforming interface of the demand database 42 in the second cloud management system 4 through the first transforming interface of the project management database 12 (step S12). The first cloud management system 1 authorizes the second cloud management system 4 to connect and access the project management database 12 (step S14).

In one embodiment, the access authority for data in the project management database 12 of the second cloud management system 4 is confirmed at the time the second cloud management system 4 is established. In another embodiment, after the second cloud management system 4 is established, the second cloud management system 4 request the first cloud management system 1 for modifying the access authority for data in the project management database 12. The access authority may be recorded selectively in the demand database 42 of the second cloud management system 4. In the step S14, the second cloud management system 4 restrictively accesses the project management database 12 according to the access authority recorded in the demand database 42.

When the second cloud management system 4 sends a request to the first cloud management system 1, the first cloud management system 1 may accept the access action from the second cloud management system 4 to the project management database 12 (step S16). In one embodiment, the second cloud management system 4 may be configured to access the project management database 12 periodically. In another embodiment, the second cloud management system 4 may accept the external operation from the corresponding member and access the project management database 12 according to the external operation. Here is not intended to be limiting.

After the step S16, the first cloud management system 1 performs a format transformation to data requested to be accessed by the second cloud management system 4 through the data transforming service module of the project management database 12 (step S18). After the step S18, the second cloud management system 4 may obtain the transformed data and store the obtained data in the demand database 42 (step S20).

After step S20, the second cloud management system 4 may perform statistical analysis to data recorded in the demand database 42, and output statistical data and analytical result through the Internet front-end. As a result, the corresponding member may obtain corresponding data of the specific project/specific building 3 with the access authority of the second cloud management system 4 under the condition of being unable to directly connect the first cloud management system 1 and/or the intelligent building systems 2. The system architecture of the existing integrated management system does not need to be modified and the security of the integrated management system is not influenced.

Figure 6:
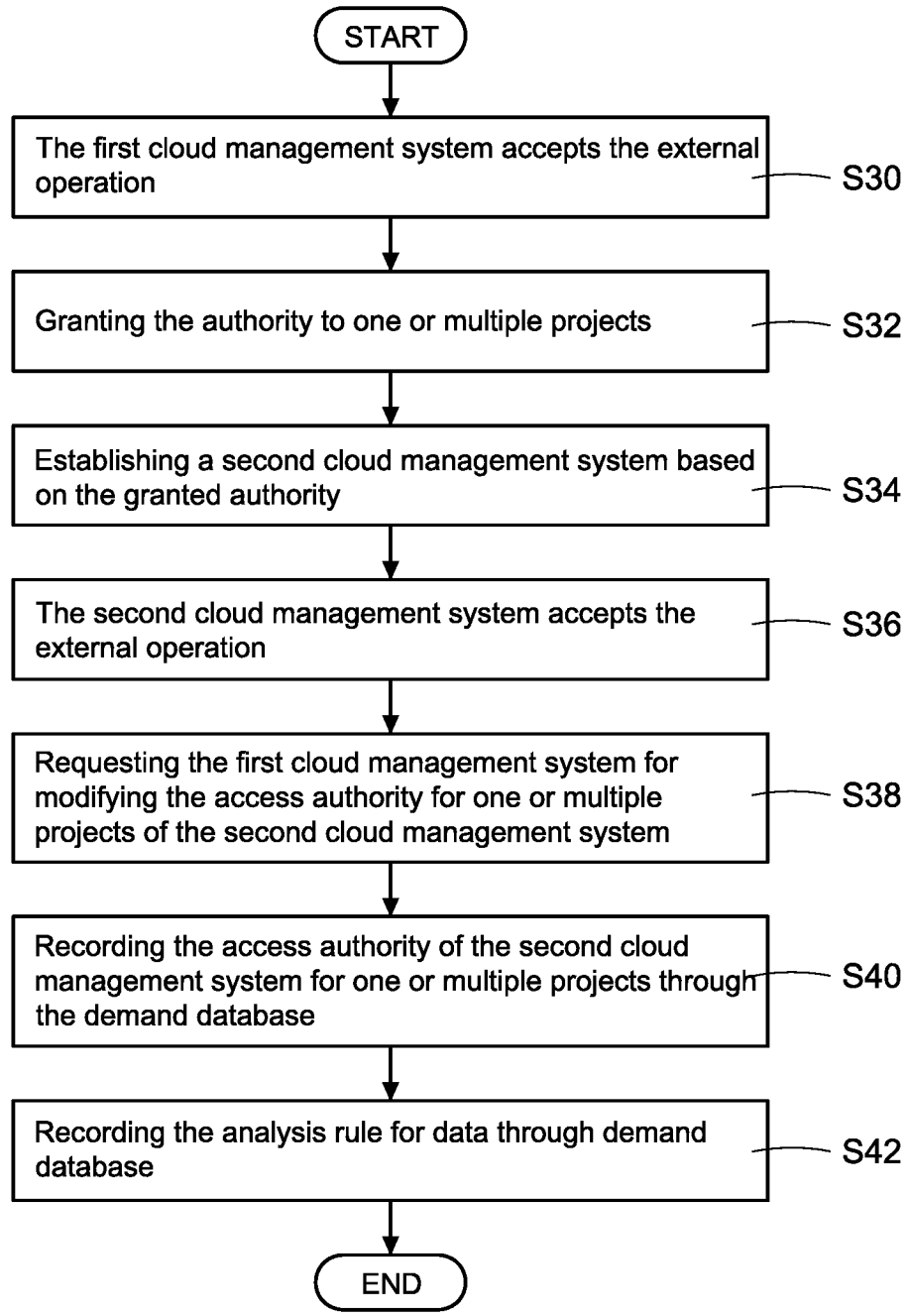
FIG. 6 is a system establishment flowchart in the first embodiment of this disclosure.

FIG. 6 is a system establishment flowchart in the first embodiment of this disclosure. In this disclosure, the user wants to have the corresponding member obtain data of the specific project/specific building without interfering the operation of the first cloud management system 1 and the intelligent building system 2, the user may operate the first cloud management system 1 to directly establish a second cloud management system 4 privileged for the corresponding member to use based on the demand.

Referring to FIG. 6, the user may log in the first cloud management system 1 from the back-end and the first cloud management system 1 may accept the external operation from the user through the first cloud configuration platform 11 (step S30). In this embodiment, the external operation refers to that the user logs in the back-end of the first cloud management system 1 by remote computer, smart phone or server and sends corresponding command to the first cloud configuration platform 11. The first cloud management system 1 may grant the authority to one or multiple projects managed by the first cloud management system 1 based on the external operation (step S32). Each project includes the buildings 3 controlled by one or multiple intelligent building systems 2 connected thereon.

After the step S32, the first cloud management system 1 may directly establish a second cloud management system 4 on the upper layer of the first cloud management system 1 based on the granted authority (step S34). In this disclosure, the corresponding member may obtain the access authority for the second cloud management system 4. Thus, the corresponding member may log in the back-end of the second cloud management system 4 to perform configuration and log in the front-end of the second cloud management system 4 to search necessary information directly.

Referring to FIG. 2, after the second cloud management system 4 is established, the second cloud management system 4 may accept the external operation from the user through the second cloud configuration platform 41 (step S36) to request the first cloud management system 1 for modifying the access authority for one or multiple projects of the second cloud management system 4 (step S38).

For example, in the step S32, the user merely grants the access authority for corresponding data in the first project. Thus, the second cloud management system 4 established in the step S34 by the first cloud management system 1 only has the authority of accessing corresponding data of the first project in the project management database 12. In other words, the corresponding member is merely able to obtain the statistical analysis data corresponding to the first project through the second cloud management system 4. If the corresponding member has other demands, such as corresponding data of the second project, the corresponding member may configure the second cloud configuration platform 41 (step S36) to make the second cloud management system 4 send the request to the first cloud management system 1 for accessing corresponding data of the second project (step S38). Thus, the first cloud management system 1 renews the access authority of the project management database 12 for the second cloud management system 4.

After the step S38, the second cloud management system 4 may record the access authorities thereof at the very time for one or multiple projects controlled by the first cloud management system 1 through the demand database 42 (step S40). Further, the second cloud management system 4 records the analysis rule for data obtained from the project management database 12 through demand database 42 (step S42).

In one embodiment, the corresponding member may configure the second cloud configuration platform 41 by the external operation to confirm the analysis rule. After corresponding data of the granted project is obtained, the second cloud management system 4 performs designated analytical action based on the analysis rule and outputs corresponding analytical result. Therefore, the corresponding member may directly search the analytical result through the Internet front-end or the cell phone front-end of the second cloud management system 4. This disclosure may be used conveniently.

As described above, the object of establishing the second cloud management system 4 in this disclosure is to facilitate the obtaining of corresponding information of specific project/specific building for the corresponding member. Therefore, before the second cloud management system 4 is authorized to access corresponding information in the first cloud management system 1, the configuration procedures to the intelligent building systems 2, the intelligent building kits 6 and the equipment in the integrated management system need to be completed.

Figure 7:
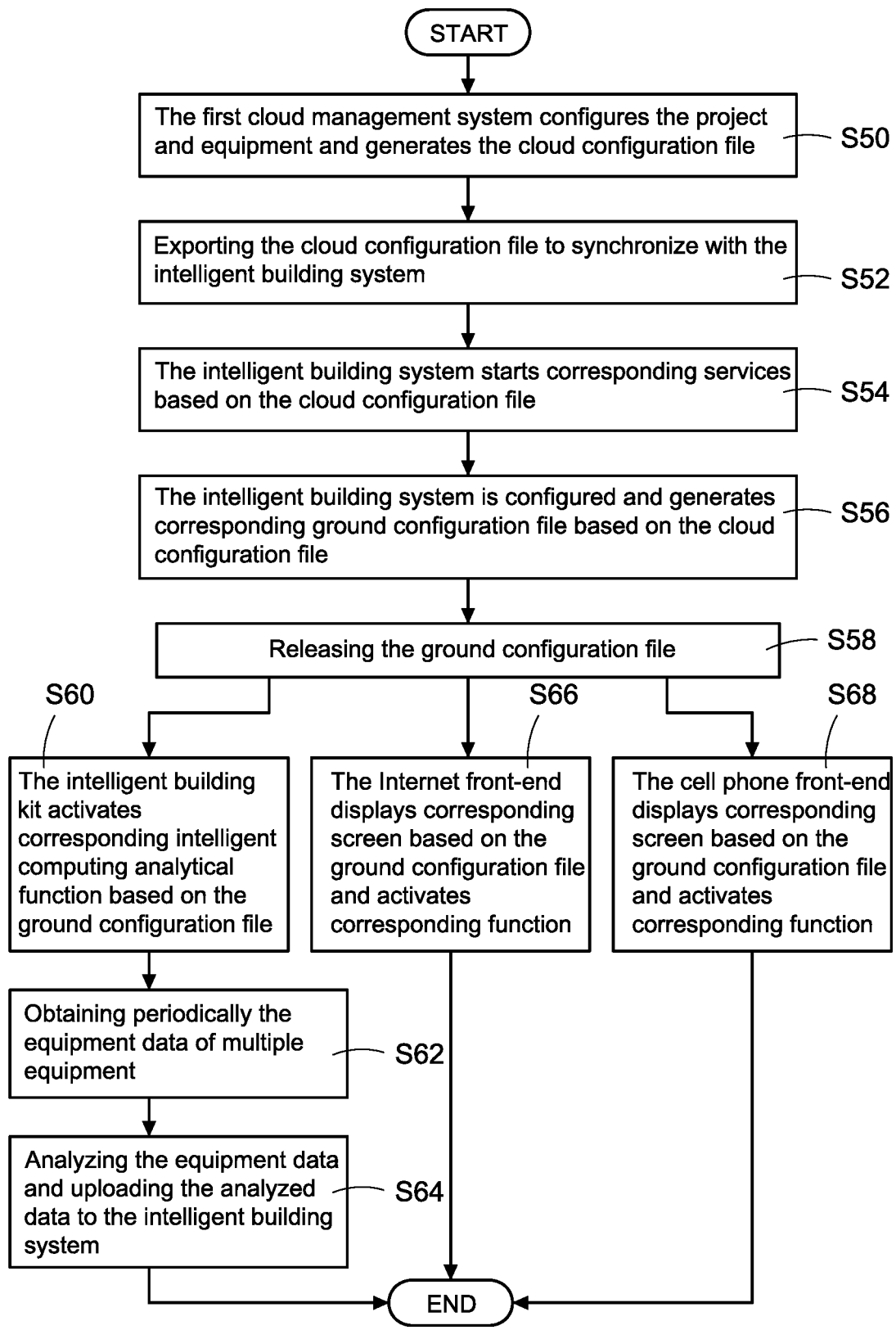
FIG. 7 is a configuration flowchart in the first embodiment of this disclosure.

FIG. 7 is a configuration flowchart in the first embodiment of this disclosure. Referring to FIG. 2 and FIG. 7, the user may log in the back-end of the first cloud management system 1 through remote computer, smart phone, or server to configure one or multiple projects by the first cloud management system 1. The user may further configure multiple equipment 7 possibly included in the building 3. The first cloud management system 1 generates corresponding cloud configuration file according to the configuration content (step S50).

Specifically, the user may configure that each project includes which intelligent building systems 2 (i.e., includes which buildings 3) and configure the equipment data, such as communication protocol, of one or multiple equipment 7 included respectively by the buildings 3. As described above, the user may directly select the equipment template infobase priorly established in the project management database 12. Thus, the equipment data of multiple equipment 7 is directly configured without editing program codes additionally.

After the step S50, the first cloud management system 1 may export the cloud configuration file to the intelligent building systems 2 to synchronize with the intelligent building systems 2 (step S52).

After the step S52, the intelligent building systems 2 may accept the cloud configuration file from the first cloud management system 1 and start one or multiple services based on content of the cloud configuration file (step S54). For example, if the first cloud management system 1 allocates the building A to the first project in the cloud configuration file and puts the intelligent building system 2 in charge of the building A, the intelligent building system 2 may start specific service corresponding to the building A in step S54.

Moreover, the cloud configuration file includes data that is directly applicable to the intelligent building system 2, such as the communication protocol of multiple equipment 7 in the controlled building 3. Thus, after the cloud configuration file is received, the intelligent building system 2 is confined by the cloud configuration file to configure oneself and generates corresponding ground configuration file (step S56).

After the step S56, the intelligent building system 2 releases the ground configuration file downwardly (step S58). Specifically, the intelligent building system 2 releases the ground configuration file to the connected one or multiple intelligent building kits 6, the Internet front-end 51 and the cell phone front-end 52 to make those perform the configuration action of themselves based on content of the ground configuration file.

In this disclosure, the intelligent building kit 6 is defined to be the corresponding type according to the property of the equipment 7 connected thereto. The intelligent building system 2 may configure the kit property of the intelligent building kit 6 based on the type of the intelligent building kit 6, and records the kit property in the ground configuration file. When the ground configuration file is accepted from the intelligent building system 2, the intelligent building kit 6 may activate corresponding intelligent computing analytical function based on the kit property recorded in the ground configuration file (step S60).

For example, the intelligent building system 2 connects to multiple lighting devices in the building 3 through the first intelligent building kit. Thus, the kit property of the first intelligent building kit in the ground configuration file is defined as lighting device kit. When the ground configuration file is received, the first intelligent building kit may activate the corresponding function like built-in light source analysis based on content of the ground configuration file to analyze the information, such as usage time, brightness, energy consumption, etc., of each lighting device in the building 3. For another example, the intelligent building system 2 connects to the air-conditioning equipment in the building 3 through the second intelligent building kit. Thus, the kit property of the second intelligent building kit in the ground configuration file is defined as air-conditioning kit. When the ground configuration file is received, the second intelligent building kit may activate the corresponding function like built-in air-conditioning analysis based on content of the ground configuration file to analyze the information, such as usage time, temperature, energy consumption, etc., of the air-conditioning equipment in the building 3. Here is not intended to be limiting.

After the step S60, the intelligent building kit 6 periodically obtains the equipment data of multiple equipment 7 connected thereto based on the ground configuration file (step S62). The intelligent building kit 6 further analyzes the equipment data through the activated intelligent computing analytical function and uploads the analyzed data to the intelligent building system 2 (step S64). In one embodiment, the intelligent building system 2 may directly upload data responded by the intelligent building kit 6 to store it in the project management database 12 of the first cloud management system 1. In another embodiment, the intelligent building system 2 may further analyze data responded by the intelligent building kit 6, and upload the analytical result to store it in the project management database 12 of the first cloud management system 1.

Moreover, in the step S56, the intelligent building system 2 may configure the rendering information and the rendering manner to the front-end and record that in the ground configuration file. After the step S58, the Internet front-end 51 of the intelligent building system 2 may receive the ground configuration file to display corresponding screen based on content of the ground configuration file, and activate corresponding function (step S66). Similarly, the cell phone front-end 52 of the intelligent building system 2 may receive the ground configuration file as well to display corresponding screen based on content of the ground configuration file, and activate corresponding function (step S68)

For example, the Internet front-end 51 may activate the functions, such as BIM model module, financial management module, organizational management module, community management module, etc., based on the ground configuration file and display corresponding screen by the functions. For another example, the cell phone front-end 52 may activate the functions of building system application, such as equipment list module, planar information module, statistical diagram module, etc., or the functions of property application, such as public facilities reservation module, visitor registration module, postal service module, residential repairing request module, etc., based on the ground configuration file.

The integrated management system and management method of this disclosure may integrate data of different buildings/projects and facilitate the configuration, management and analysis to data for the user. Furthermore, the corresponding member may obtain necessary data at any time through the establishment of the second cloud management systems. The scalability of the building system is increased.

Although this disclosure has been described with reference to the foregoing preferred embodiment, it will be understood that the disclosure is not limited to the details thereof. Various equivalent variations and modifications can still occur to those skilled in this art in view of the teachings of this disclosure. Thus, all such variations and equivalent modifications are also embraced within the scope of the disclosure as defined in the appended claims.

What is claimed is:

1. An integrated intelligent building management system, comprising:
   a first cloud management system, comprising a first cloud configuration platform and a project management database comprising a first transforming interface and a data transforming service module;
   an intelligent building system, connected with and managed by the first cloud management system, and a corresponding data of a building controlled by the intelligent building system being stored in the project management database;
   a second cloud management system, comprising a second cloud configuration platform and a demand database comprising a second transforming interface, wherein data in the demand database is part or all of data in the project management database of the first cloud management system, wherein the first cloud configuration platform is configured to accept an external operation to grant an access authority of one or multiple projects managed by the first cloud management system, establish a Docker image based on authorized content, and then establish the second cloud management system according to the access authority being granted through executing the Docker image when a cloud management system establishment button is activated, wherein at least one of the one or multiple projects comprises the building controlled by the intelligent building system; and an intelligent building kit, wherein the intelligent building system connecting multiple equipment in the building through the intelligent building kit, the intelligent building kit comprises an edge computing module performing an intelligent computing analytical function correspondingly according to an equipment property of the multiple equipment connected thereto and uploading an analyzed data to the intelligent building system;

wherein the first cloud management system is connected with the second transforming interface of the second cloud management system through the first transforming interface and authorizes the second cloud management system to connect and access data of the project management database under an authorized scope, the project management database and the demand database adopt different data structure, and the first cloud management system performs a format transformation to data in the project management database through the data transforming service module, and the second cloud management system stores a transformed data in the demand database, the first cloud management system is configured to withdraw the access authority and to remove the second cloud management system from a cloud space when a task corresponding to the access authority is finished;

wherein the second cloud configuration platform accepts a second external operation to request the first cloud management system to modify the access authority of the corresponding data of the one or multiple projects, and the demand database records the access authority of the second cloud management system for the corresponding data of the one or multiple projects and an analysis rule of the second cloud management system for data obtains from the project management database, and the analysis rule comprises algorithm used by analysis, types of analysis, time point of analysis, and action executed after analysis.

2. The system of claim 1, wherein the first cloud configuration platform comprises a project management module establishing the one or multiple projects, a building management module establishing and managing a 3D model of the building, and an equipment communication management module defining a communication protocol of multiple equipment in the building, wherein the first cloud management system generates a cloud configuration file through the first cloud configuration platform and synchronizes with the intelligent building system according to the cloud configuration file.

3. The system of claim 1, wherein the first cloud management system further comprises a first Internet management platform, the second cloud management system further comprises a second Internet management platform, the first Internet management platform provides a first real-time information display module and a first alarm module through a first Internet front-end, the second Internet management platform provides a second real-time information display module and a second alarm module through a second Internet front-end.

4. The system of claim 1, wherein the project management database comprises a hierarchical database and further comprises:
a first layer database field, storing a building body data, wherein the building body data comprises a building name and a building location of the building controlled by the intelligent building system, and an equipment data of multiple equipment in the building;
a second layer database field, linked with the first layer database field and storing a project data of the one or multiple projects; and
a third layer database field, linked with the second layer database field and storing a project manager data of project managers of the one or multiple projects.

5. The system of claim 4, wherein the project management database further comprises an equipment template infobase, the equipment template infobase accepts a configuration of a rule, a property, a communication interface, and a data transmission format, for an unknown equipment from a user to add an equipment data of the unknown equipment to the first layer database field.

6. The system of claim 1, wherein the intelligent building system comprises a ground configuration platform configuring the intelligent building system and multiple equipment in the building according to a cloud configuration file, a ground data processor performing a statistical analysis to data collected from the building, a communication convertor establishing a communication between the intelligent building system and the building, and a data manager recording a ground configuration file of the intelligent building system and a historical record of the building.

7. The system of claim 6, wherein the ground configuration platform comprises a configuration file generating unit and at least one sub-module, the configuration file generating unit generates the ground configuration file by a remote control or an offline control, the at least one sub-module is activated by control of the first cloud management system.

8. The system of claim 6, wherein the intelligent building kit receiving the ground configuration file from the intelligent building system and obtaining an equipment data of the multiple equipment based on the ground configuration file periodically.

9. The system of claim 8, wherein the ground data processor comprises a data receiving unit receiving the equipment data uploaded by the intelligent building kit, a command processing unit receiving a command request of a third Internet front-end, and a cloud interface connecting unit uploading the equipment data to the first cloud management system.

10. A management method incorporating with the integrated intelligent building management system of claim 1, the management method comprising:
a11) accepting, by the first cloud management system, a first external operation through the first cloud configuration platform to grant an access authority of one or multiple projects managed by the first cloud management system;
a12) establishing a Docker image based on authorized content and then establishing the second cloud management system according to the access authority being granted through executing the Docker image when a cloud management system establishment button is activated, wherein at least one of the one or multiple projects comprises the building controlled by the intelligent building system;
a) receiving the corresponding data of the building from the intelligent building system and storing that in the project management database, by the first cloud management system;
b) connecting the first cloud management system with the second transforming interface of the second cloud management system through the first transforming interface;
c) authorizing, by the first cloud management system, the second cloud management system to connect and access data of the project management database under an authorized scope;
d) accepting, by the first cloud management system, an access action of the second cloud management system to the project management database;
e) performing, by the first cloud management system, the format transformation to data corresponding to the access action through the data transforming service module;
f) storing, by the second cloud management system, the transformed data in the demand database, wherein data in the demand database is part or all of data in the project management database, and the project management database and the demand database adopt different data structure;
f0) accepting, by the second cloud configuration platform, a second external operation to request the first cloud management system to modify the access authority of the corresponding data of the one or multiple projects, wherein the demand database records the access authority of the second cloud management system for the corresponding data of the one or multiple projects and analysis rule of the second cloud management system for data obtains from the project management database, and the analysis rule comprises algorithm used by analysis, types of analysis, time point of analysis, and action executed after analysis; and
f1) withdrawing, by the first cloud management system, the access authority and to remove the second cloud management system from a cloud space when a task corresponding to the access authority is finished;
wherein the intelligent building system connects multiple equipment in the building through the intelligent building kit, the intelligent building kit comprises an edge computing module, and the edge computing module performs an intelligent computing analytical function correspondingly according to an equipment property of the multiple equipment connected thereto and uploads an analyzed data to the intelligent building system.

11. The management method of claim 10, wherein the step a) further comprises:
   a21) configuring the one or multiple projects, configuring a communication protocol of multiple equipment in the building and generating a cloud configuration file, by the first cloud configuration platform; and
   a22) exporting the cloud configuration file to synchronize the first cloud management system and the intelligent building system.

12. The management method of claim 11, wherein the step a) further comprises:
   a31) receiving, by the intelligent building system, the cloud configuration file from the first cloud management system;
   a32) starting one or multiple services correspondingly based on the cloud configuration file;
   a33) configuring the intelligent building system and generating a ground configuration based on the cloud configuration file.

13. The management method of claim 12, wherein the step a) further comprises:
   a51) releasing the ground configuration file by the intelligent building system;
   a52) receiving the ground configuration file, displaying a first corresponding screen and activating a first corresponding function, by an Internet front-end; and
   a53) receiving the ground configuration file, displaying a second corresponding screen and activating a second corresponding function, by a cell phone front-end.

14. The management method of claim 12, wherein the step a) further comprises: configuring a kit property of the intelligent building kit based on a property of the multiple equipment connected by the intelligent building kit and recording the kit property by the ground configuration file.

15. The management method of claim 14, wherein the step a) further comprises:
   a41) releasing the ground configuration file by the intelligent building system;
   a42) activating, by the intelligent building kit, an intelligent computing analytical function correspondingly based on the ground configuration file; and
   a43) obtaining periodically an equipment data of the multiple equipment based on the ground configuration file, analyzing the equipment data through the intelligent computing analytical function and uploading an analyzed data to the intelligent building system, by the intelligent building kit.

\* \* \* \* \*